(12) United States Patent
Jen

(10) Patent No.: US 12,092,915 B1
(45) Date of Patent: Sep. 17, 2024

(54) TOUCH DISPLAY PANEL, AND DISPLAY DEVICE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Chen-Ming Jen, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/508,250

(22) Filed: Nov. 14, 2023

(30) Foreign Application Priority Data

May 4, 2023 (CN) .......................... 202310491656.7

(51) Int. Cl.
  *G02F 1/1333* (2006.01)
  *G02F 1/1335* (2006.01)
  *G06F 3/041* (2006.01)

(52) U.S. Cl.
  CPC .... *G02F 1/133331* (2021.01); *G02F 1/13338* (2013.01); *G02F 1/133533* (2013.01); *G06F 3/0412* (2013.01); *G02F 2202/02* (2013.01)

(58) Field of Classification Search
  CPC ........... G02F 1/133331; G02F 1/13338; G06F 3/0412
  See application file for complete search history.

(56) References Cited

U.S. PATENT DOCUMENTS

| | | | |
|---|---|---|---|
| 10,367,173 B1* | 7/2019 | Wu | H10K 59/873 |
| 2016/0011633 A1* | 1/2016 | Watanabe | G02F 1/1333 |
| | | | 345/184 |
| 2016/0239132 A1* | 8/2016 | Lee | G06F 1/1652 |
| 2017/0300736 A1 | 10/2017 | Song et al. | |
| 2022/0199951 A1* | 6/2022 | Ryu | H10K 50/844 |

FOREIGN PATENT DOCUMENTS

| | | | | |
|---|---|---|---|---|
| CN | 113325623 A | * | 8/2021 | ....... G02F 1/133308 |
| TW | 201224716 A | | 6/2012 | |
| TW | 201625106 A | | 7/2016 | |

OTHER PUBLICATIONS

CN 113325623 (Year: 2021).*

* cited by examiner

*Primary Examiner* — Jessica M Merlin
(74) *Attorney, Agent, or Firm* — CKC & Partners Co., LLC

(57) ABSTRACT

A touch display panel includes: an embedded touch liquid crystal display (LCD) module, a polarizer, and a cover plate. The embedded touch LCD module includes a non-filter window. The polarizer is disposed over the embedded touch LCD module. The polarizer includes a polarizing layer, and the polarizing layer includes a base layer and a dichroic absorption layer disposed in the base layer. The dichroic layer has a non-polarized window, and the first vertical projection of the non-polarized window overlaps with the second vertical projection of the non-filtering window. The cover plate covers the polarizer. The disclosure also provides a method for manufacturing the touch display panel and a display device including the touch display panel.

13 Claims, 10 Drawing Sheets

TOUCH DISPLAY PANEL, AND DISPLAY DEVICE

CROSS-REFERENCE TO RELATED APPLICATION

This application claims priority to China Application Serial Number 202310491656.7, filed May 4, 2023, which is herein incorporated by reference in its entirety.

BACKGROUND

Field of Invention

The present disclosure relates to an embedded touch display panel, a manufacturing method thereof, and a display device including the embedded touch display panel.

Description of Related Art

A liquid crystal display (LCD) panel typically has a laminated structure, which is generally formed by stacking a liquid crystal panel, a polarizer and a protective cover in sequence. At present, touch display panels may be divided into two types: out-cell type and embedded type. The out-cell type of touch display panel includes a layer of touch sensor superimposed on the outside of liquid crystal panel. The embedded type of touch display panels may be further divided into two types: on-cell type and in-cell type. In an on-cell type of touch display panel, a touch module is disposed on a liquid crystal module; in an in-cell type of touch display panel, a touch module is disposed within a liquid crystal module. The in-cell type of touch display panel has the advantage of reducing the total thickness; therefore, panel manufacturers continue to actively invest in the research and development of this type of device.

The liquid crystal display panel has a polarizer to control the polarization direction of light, so that the liquid crystal display panel can obtain the changes of light and dark display by applying an external electric field. In conventional display devices, light sensor modules, such as infrared sensors and ambient light sensors, are usually disposed in the frame region of the display panel. However, with the development of full-screen displays, the frame region is getting narrower and narrower, and there is not enough space to set the sensor modules, so it is necessary to dispose the sensor modules in the non-display area outside the edge of the display area. Therefore, it is necessary to form a gap in the polarizer at a position corresponding to the light sensor module, so that external light enters the light sensor module. In the conventional in-cell type of touch display panel, a top polarizer is disposed on the outermost side, and a gap in the top polarizer is formed at a position corresponding to the light sensor module; however, this arrangement makes the outer surface of the touch display panel (i.e., the user's contact surface) uneven. In addition, the top polarizer is made of plastic material. Thus, for the conventional in-cell type of touch display panel, the user's touch feeling is poor.

SUMMARY

It is to be understood that both the foregoing general description and the following detailed description are by examples, and are intended to provide further explanation of the invention as claimed.

In view of the above problems, the technical scheme of the present disclosure improves the arrangement of the user's contact surface and polarizer of the in-cell type of embedded touch display panel. A non-polarized window is formed in the polarizer, and a cover plate is attached to the outer side of the polarizer, so that the outer surface of the touch display panel is fully flat, which is more convenient in operation and enhances the user's touch feeling.

Some embodiments of the present disclosure provide a touch display panel including an embedded touch liquid crystal display (LCD) module, a polarizer, and a cover plate. The embedded touch LCD module includes a non-filter window. The polarizer is disposed over the embedded touch LCD module. The polarizer includes a polarizing layer, and the polarizing layer includes a base layer and a dichroic absorption layer disposed in the base layer. The dichroic absorption layer has a non-polarized window, and a first vertical projection of the non-polarized window overlaps with a second vertical projection of the non-filter window. The cover plate overlays the polarizer.

In some embodiments, the material of the base layer is polyvinyl alcohol, and the dichroic absorption layer includes iodine compounds.

In some embodiments, the cover plate has a thickness less than about 200 μm (micrometers).

In some embodiments, the cover plate has a thickness ranging from about 25 μm to about 50 μm.

In some embodiments, the cover plate includes ultra-thin glass, polymethylmethacrylate, polyethylene terephthalate, polycarbonate, or the like.

In some embodiments, the material of the cover plate is free of triacetyl cellulose.

In some embodiments, the cover plate includes a substrate layer and an optical layer. The substrate layer includes ultra-thin glass, polymethylmethacrylate, polyethylene terephthalate, polycarbonate, or the like. The optical layer is an anti-reflection layer, an anti-glare layer, an anti-fouling layer, the like, or a combination thereof.

In some embodiments, the material of the cover plate is ultra-thin glass having a hardness greater than 7H of pencil hardness.

In some embodiments, the cover plate includes tempered ultra-thin glass.

In some embodiments, the touch display panel further includes an infrared ink layer disposed under the embedded touch LCD module, and a third vertical projection of the infrared ink layer overlaps with the first vertical projection of the non-filter window and the second vertical projection of the non-polarized window.

In some embodiments, the touch display panel has a first side, a second side, a third side, and a fourth side, and the embedded touch LCD module further includes a terminal region located near the first side of the touch display panel, and in the second side, the third side, and the fourth side, a plurality of respective edges of the embedded touch LCD module, the polarizer, and the cover plate are flush.

In some embodiments, in the first side, the edge of the embedded touch LCD module exceeds the corresponding edge of the cover plate and the corresponding edge of the polarizer.

In some embodiments, in the first side, the edge of the embedded touch LCD module is flush with the corresponding edge of the cover plate and the corresponding edge of the polarizer.

In some embodiments, the polarizer and the cover plate have a total thickness less than about 300 μm.

Some embodiments of the present disclosure provide a display device including a touch display panel and an optical module. The touch display panel is the touch display panel as described in the above and the following embodiments. The optical module is disposed under the embedded touch LCD module, and a fourth vertical projection of the optical module overlaps with the first vertical projection of the non-filter window and the second vertical projection of the non-polarized window.

Some embodiments of the present disclosure provide a method for manufacturing a touch display panel, and the method includes: forming a polarizing layer, the polarizing layer including a base layer and a dichroic absorption layer in the base layer; removing a portion of the dichroic absorption layer to form a non-polarized window; disposing a first protective layer and a second protective layer respectively on both sides of the polarizing layer to form a polarizer, wherein the polarizer has the non-polarized window; attaching the polarizer having the non-polarized window to a cover plate to form a first stack structure; trimming the edges of the first stack structure; and attaching the first stack structure with the embedded touch LCD module to form a second stack structure, wherein the embedded touch LCD module has a non-filter window, and the position of the non-polarized window corresponds to the non-filter window.

In some embodiments, removing the portion of the dichroic absorption layer to form the non-polarized window through chemical bleaching or ultraviolet irradiation.

In some embodiments, during the step of removing the portion of the dichroic absorption layer to form the non-polarized window, the base layer is not removed.

In some embodiments, in method for manufacturing the touch display panel, the second stack structure has a first side, a second side, a third side and a fourth side, and the embedded touch LCD module has a terminal region near to the first side of the second stack structure, and the method for manufacturing the touch display panel further includes grinding edges of the second side, the third side and the fourth side of the second stack structure.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
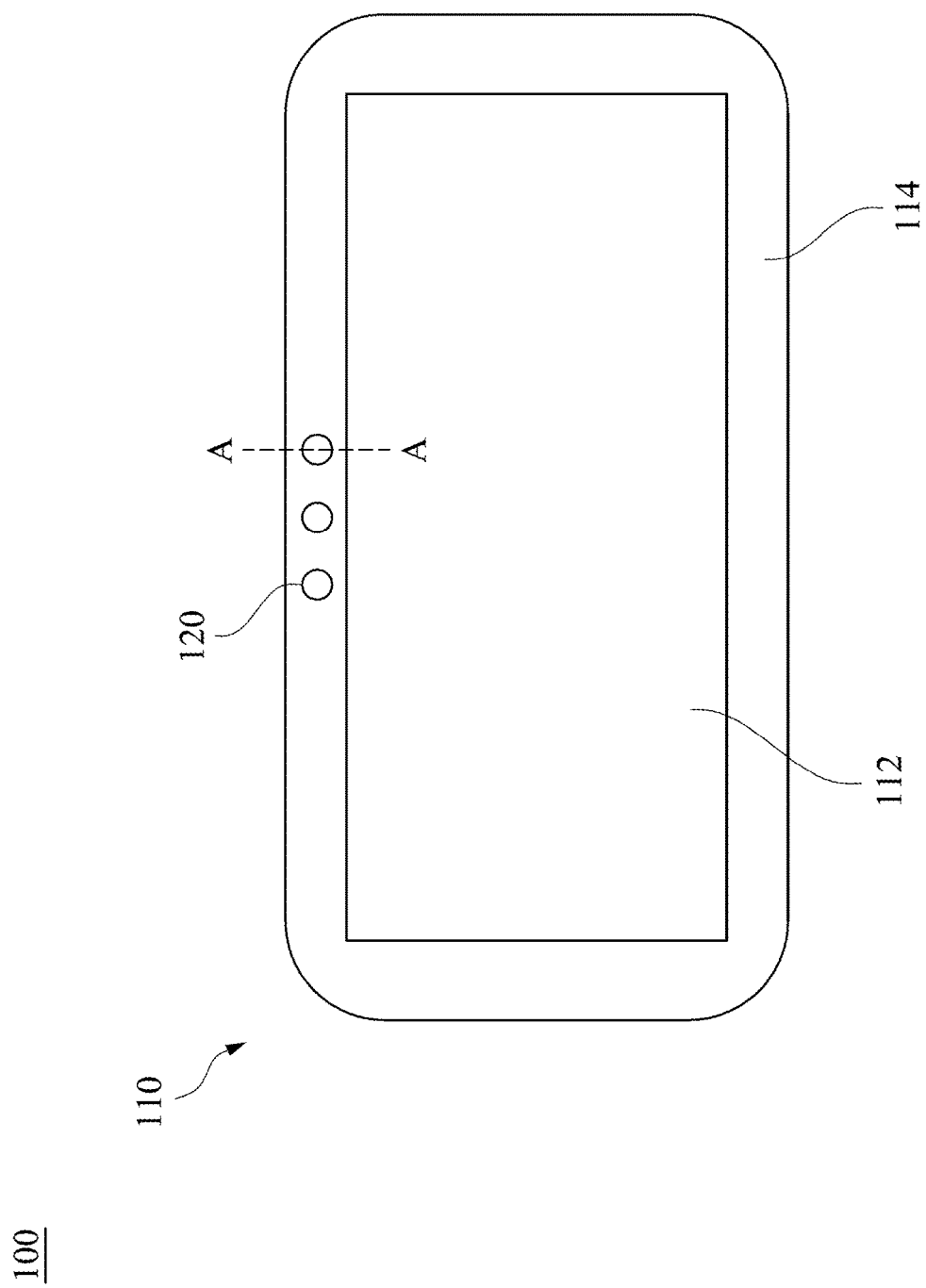
FIG. 1A illustrates a top view of a display device, in accordance with some embodiments.

In order to make the description of this disclosure more detailed and complete, the following is an illustrative description of the embodiments and specific examples of this disclosure; but, this is not the only way to practice or use the specific embodiments of the present disclosure. The embodiments disclosed below can be combined or replaced with each other under beneficial circumstances, and other embodiments can be added to one embodiment without further description or explanation.

In the following description, numerous specific details will be set forth in detail to enable readers to fully understand the following embodiments. However, embodiments of the present disclosure may be practiced without these specific details. In other cases, in order to simplify the drawings, well-known structures and devices are only schematically shown in the drawings.

In addition, the present disclosure may repeat reference numerals and/or letters in the various examples. This repetition is for the purpose of simplicity and clarity and does not in itself dictate a relationship between the various embodiments and/or configurations discussed. In addition, in the following disclosure, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A illustrates a schematic top view of a display device according to some embodiments. The top view of FIG. 1A shows a display device 100 includes a touch display panel 110. The touch display panel 110 includes a display area 112 and a non-display area 114. The non-display area 114 surrounds the display area 112. In the non-display area 114, a plurality of optical modules 120 are provided.

Figure 1B:
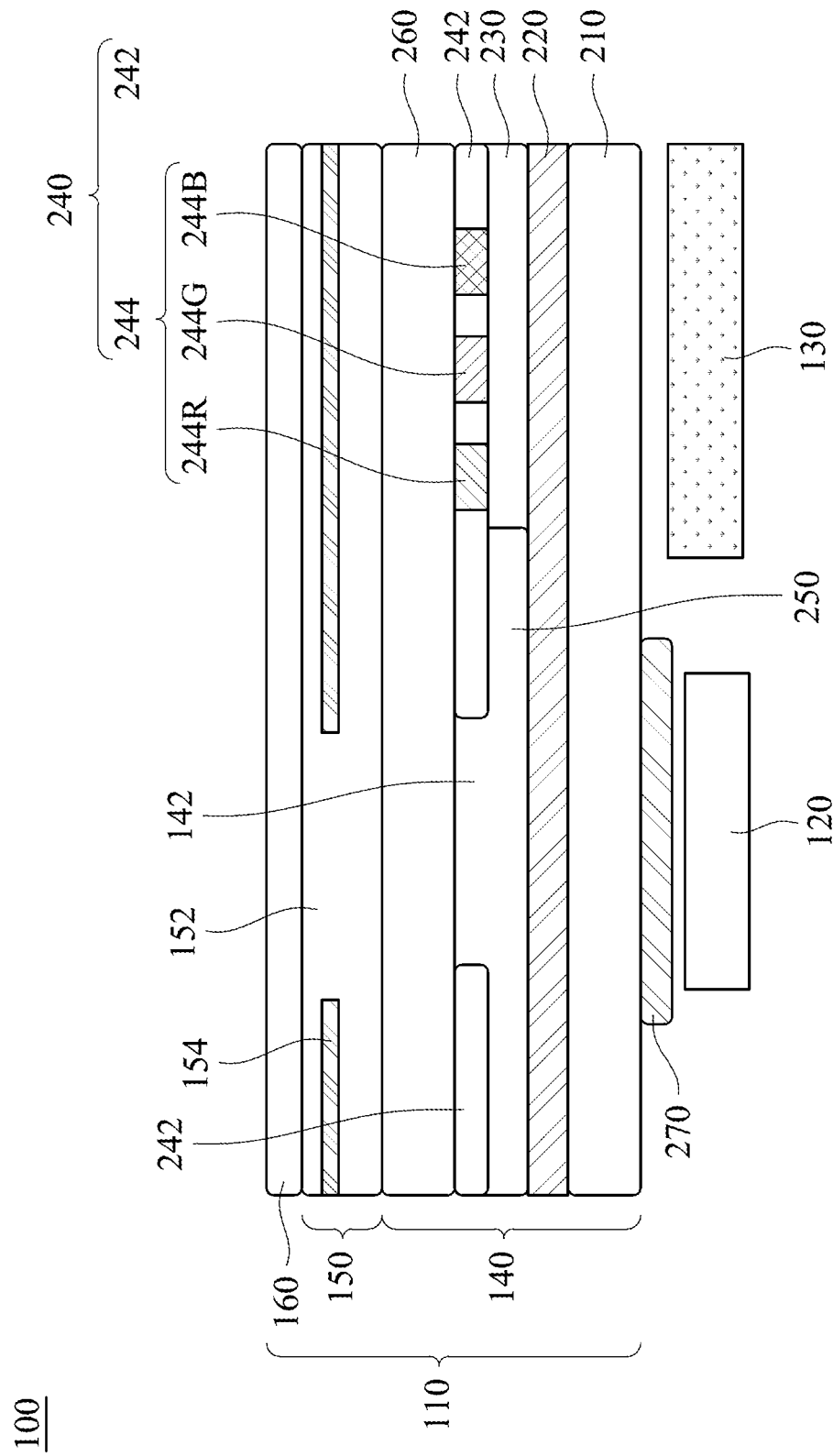
FIG. 1B is a cross-sectional view of the display device of FIG. 1A along cutting line A-A.

FIG. 1B is a partial cross-sectional view of the display device 100 taken along the cutting line A-A. The display device 100 includes a touch display panel 110, an optical module 120 and a backlight module 130.

Referring to FIGS. 1A and 1B, the touch display panel 110 is an in-cell type of touch display panel. The optical module 120 is located in a position corresponding to the non-display area 114 of the touch display panel 110 and under the touch display panel 110. The backlight module 130 is located in a position corresponding to the display area 112 of the touch display panel 110 and under the touch display panel 110.

In some embodiments, the optical module 120 includes an optical sensor, such as an infrared sensor, an infrared light emitting diode, a visible light lens module, a light emitting diode, a light sensor, an infrared image lens module, the like, or a combination thereof.

As shown in FIG. 1B, the touch display panel 110 includes an embedded touch LCD module 140, a polarizer 150, and a cover plate 160 stacked in sequence. The embedded touch LCD module 140 includes a non-filter window 142. The polarizer 150 includes a dichroic absorption layer 154, and the dichroic absorption layer 154 has a non-polarized window 152. The non-polarized window 152 makes the light transmitted to this region unpolarized. As shown in FIG. 1B, a first vertical projection of the non-filter window 142 and a second vertical projection of the non-polarized window 152 overlap to form a light sensing window, so that light can enter the optical module 120 from the outside or light can be emitted from the optical module 120. As used herein, "vertical projection" refers to a projection in a direction perpendicular to the touch display panel 110.

As shown in FIG. 1B, the embedded touch LCD module 140 includes a thin film transistor layer 210, a touch layer 220, a liquid crystal layer 230, a color filter layer 240, a sealing layer 250, and a color filter glass 260. In the embedded touch LCD module 140, the touch layer 220 is disposed between the thin film transistor layer 210 and the liquid crystal layer 230, so that the circuit traces for controlling the touch layer 220 and the liquid crystal layer 230 can be disposed above the thin film transistor layer 210, thereby reducing the volume of the embedded touch LCD module 140.

The thin film transistor layer 210 is disposed on a side of the embedded touch LCD module 140 away from the polarizer 150. The touch layer 220 is disposed over the thin film transistor layer 210. The touch layer 220 may include a plurality of touch electrodes. The liquid crystal layer 230 is disposed over the touch layer 220 and located in the display area 112 of the touch display panel 110. The liquid crystal layer 230 includes a plurality of liquid crystal molecules. The sealing layer 250 is disposed in the same layer as the liquid crystal layer 230 and is located in the non-display area 114 of the touch display panel 110. The sealing layer 250 is a transparent material for sealing the liquid crystal layer 230.

The color filter layer 240 is disposed over the liquid crystal layer 230. The color filter layer 240 includes a plurality of light-transmitting filter units 244 and an opaque black matrix 242 separating the plurality of filter units 244. Each filter unit 244 also includes at least three sub-filter units 244R, 244G, and 244B for different primary colors. The colors of different sub-filter units 244R, 244G and 244B in the same filter unit 244 are different. For example, the sub-filter unit 244R may be red and used for transmitting the light of the red primary color and filtering out the light of other colors. The sub-filter unit 244G may be green and used for transmitting the light of the green primary color and filtering out the light of other colors. The sub-filter unit 244B may be blue and used for transmitting the light of the blue primary color and filtering out the light of other colors. The black matrix 242 is also used to separate each of the sub-filter units 244R, 244G and 244B. In the non-display area 114, the corresponding portions of the color filter layer 240 includes the black matrix 242 and does not include sub-filter units 244R, 244G and 244B.

In the color filter layer 240, a non-filter window 142 is provided without filter function, which is used to allow light directly pass through without filtering. The non-filter window 142 is located in the non-display area 114 of the touch display panel 110 and is filled with the transparent material of the sealing layer 250.

The color filter glass 260 is located over the color filter layer 240 and contacts the polarizer 150. In some embodiments, the color filter glass 260 is disposed between the color filter layer 240 and the polarizer 150.

In some embodiments, the embedded touch LCD module 140 further includes an infrared ink layer 270, which is disposed under the thin film transistor layer 210 and corresponds to the position of the optical module 120. That is, the first vertical projection of the non-filter window 142, the second vertical projection of the non-polarized window 152, the third vertical projection of the infrared ink layer 270, and the fourth vertical projection of the optical module 120 overlap, so that light can enter the optical module 120 from the outside or be emitted from the optical module 120.

In some embodiments, the infrared ink layer 270 contains a resin, a pigment and a hardener. The infrared ink layer 270 may have a light transmittance of less than 15% at a wavelength of 550 nm and have a light transmittance of more than 75% at a wavelength of 850 nm.

In some embodiments, when the optical module is an infrared sensing device, the arrangement of the infrared ink layer 270 can effectively increase the transmittance of infrared light and increase the sensitivity and detection distance of the infrared light detection function of the electronic product. In addition, with the low visible light transmittance, the effect of hiding the infrared detection hole can be achieved, so that the appearance of the touch display panel 110 is consistent and the privacy of the infrared sensing device can be maintained.

Referring to FIG. 1B, the polarizer 150 is disposed over the color filter glass 260. In some embodiments, the polarizer 150 is attached to the color filter glass 260 of the embedded touch LCD module 140.

Figure 2:
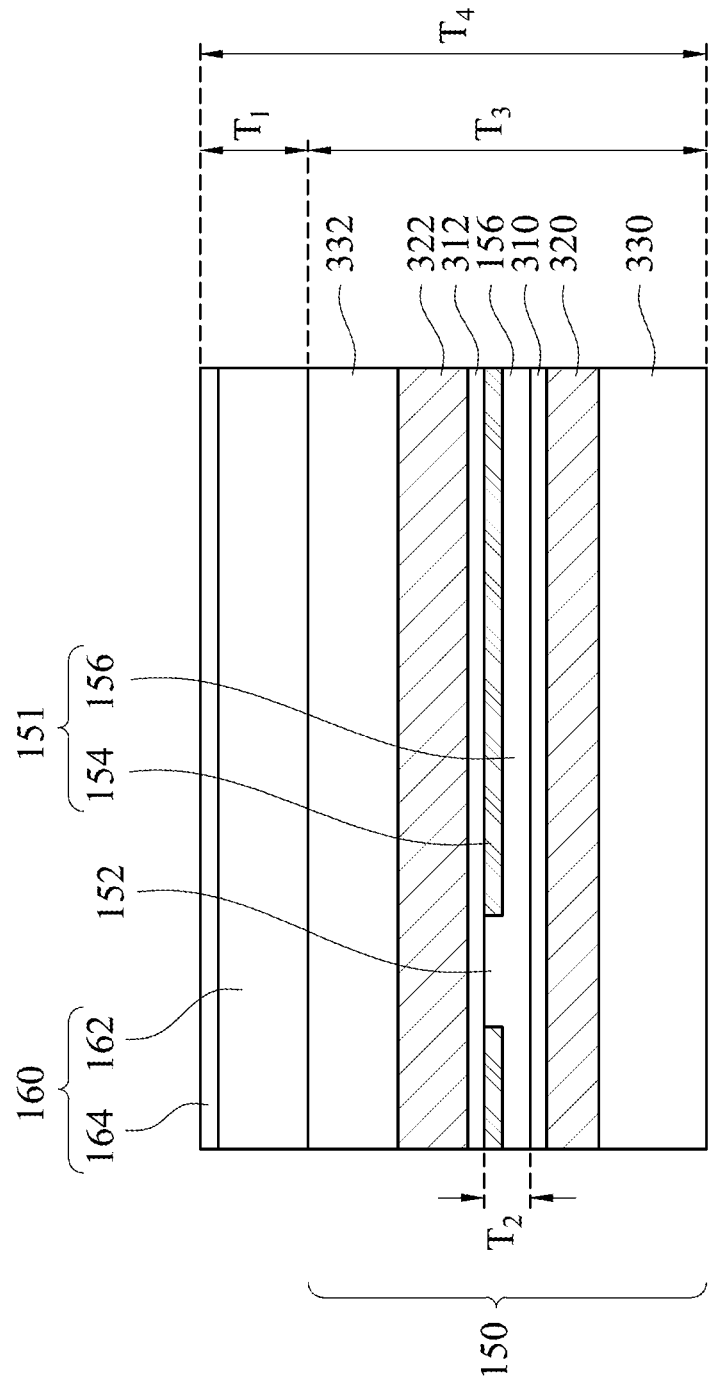
FIG. 2 illustrates a cross-sectional view including a cover plate and a polarizer, in accordance with some embodiments.

Please refer to FIG. 2, which shows the more detailed structure of the polarizer 150 and the cover plate 160.

The polarizer 150 includes a polarizing layer 151 for controlling the polarization direction of light. The polarizing layer 151 includes a base layer 156 and a dichroic absorption layer 154 in the base layer 156. The polarizer 150 further includes a first adhesive layer 310 under the base layer 156 of the polarizing layer 151, a second adhesive layer 312 over the base layer 156 of the polarizing layer 151, a first protective layer 320 under the first adhesive layer 310, a second protective layer 322 over the second adhesive layer 312, a first optical clear adhesive layer 330 under the first protective layer 320, and a second optical clear adhesive layer 332 over the second protective layer 322.

As shown in FIG. 2, the polarizing layer 151 includes a base layer 156 and a dichroic absorption layer 154 in the base layer 156. In some embodiments, the material of the base layer 156 includes polyvinyl alcohol (PVA). Since polyvinyl alcohol is easy to hydrolyze, a first protective layer 320 and a second protective layer 322 are provided on both sides of the polarizing layer 151. In some embodiments, the dichroic absorption layer 154 comprises an iodine compound.

In an embodiment, the base layer 156 is a polyvinyl alcohol film, and the dichroic absorption layer 154 contains potassium iodide. After being dyed, the polyvinyl alcohol film absorbs iodine molecules having dichroic absorption function to form the dichroic absorption layer 154, and the iodine molecules are arranged in order on the polyvinyl alcohol film by stretching from both sides of the polyvinyl alcohol film to form the polarizing layer with uniform dichroic absorption performance, thus achieving the polarizing effect. In other embodiments, the material of the dichroic absorption layer 154 can also be other dye molecules having dichroic absorption function, which are attached to the base layer 156 by immersion dyeing and then spread, thus making the polarizing layer have polarizing effect.

In some embodiments, the non-polarized window 152 is disposed by stripping the iodine compound in the dichroic absorption layer 154 through ultraviolet irradiation, such as ultraviolet laser etching. In other embodiments, the iodine compound in the dichroic absorption layer 154 can also be reduced to iodine ions via an alkaline solution, so that the polarization properties of the iodine compound is lost, thereby losing the polarization function of the dichroic absorption layer 154.

The first protective layer 320 is attached under the base layer 156 of polarizing layer 151 via the first adhesive layer 310. The second protective layer 322 is attached over the base layer 156 of the polarizing layer 151 via the second adhesive layer 312. In some embodiments, the materials of the first adhesive layer 310 and the second adhesive layer 312 may be solid optically clear adhesive (OCA).

The material of the first protective layer 320 may be triacetyl cellulose (TAC), and the phase of the first protective layer 320 is 0 degrees. The material of the second protective layer 322 may also be triacetyl cellulose. The material of triacetyl cellulose has high light transmittance, so triacetyl cellulose is used as a protective layer to protect the base layer 156 of the polarizing layer 151 without affecting the display effect.

The first optical clear adhesive layer 330 is disposed under the first protective layer 320, so that the polarizer 150 can be attached to the underlying structural layer, such as the color filter glass 260. The second optical clear adhesive layer 332 is disposed on the second protective layer 322, so that the polarizer 150 can be attached to an upper structural layer, such as the cover plate 160. In some embodiments, when the polarizer is not bonded or attached to other layer, the polarizer also includes a releasing film layer (not shown) bonded on the optical clear adhesive layer 342, and this releasing film is removed during bonding.

Referring to FIG. 1B again, the cover plate 160 is disposed over the polarizer 150. In some embodiments, the cover plate 160 is attached on the polarizer 150.

In some embodiments, the cover plate 160 includes a transparent material such as ultra-thin glass (UTG), polymethylmethacrylate (PMMA), polyethylene terephthalate (PET), polycarbonate (PC), or the like.

In some embodiments, the material of the cover plate 160 does not contain triacetyl cellulose.

In some embodiments, the cover plate 160 has a thickness ranging from about 25 µm to about 200 µm, such as 25 µm, 30 µm, 50 µm, 70 µm, 100 µm, 145 µm, 175 µm, or 200 µm. In some embodiments, the cover plate 160 has a thickness ranging from about 25 µm to about 50 µm. In some embodiments, the thickness variation of the cover plate 160 is less than 5 µm. In some embodiments, the thickness tolerance of the cover plate 160 is +10 µm. In some embodiments, the surface roughness of the cover plate 160 is less than 1 nanometer (nm).

In some embodiments, the material of the cover plate 160 is ultra-thin glass having a thickness ranging from about 25 µm to about 50 µm.

In some embodiments, the material of the cover plate 160 is ultra-thin glass, and the hardness of the cover plate 160 is equal to or greater than pencil hardness 7H, for example, the hardness is 7H, 8H or 9H. In some embodiments, the cover plate is tempered ultra-thin glass, i.e., ultra-thin glass that has been strengthened, such as glass that has been chemically strengthened. In some embodiments, a high-purity potassium nitrate solution is used with a catalyst to act on the material of ultra-thin glass, so that ions in the glass component exchange with potassium ions in the potassium nitrate solution, thereby forming a strengthened layer. Therefore, using a cover plate containing ultra-thin glass on the outer surface of the touch display panel is less likely to cause broken screen due to breakage.

As shown in FIG. 2, in some embodiments, the cover plate 160 includes a substrate layer 162 and an optical layer 164 disposed over the substrate layer 162. The substrate layer 162 of the cover plate 160 may be a transparent material such as ultra-thin glass, polymethylmethacrylate, polyethylene terephthalate, polycarbonate, or the like. A surface treatment may be performed on the upper surface of the substrate layer 162 to form a surface coating (i.e., the optical layer 164), such as an anti-reflection layer, an anti-glare layer, an anti-fouling layer, the like, or a combination thereof.

In some embodiments, the optical layer 164 is or includes an anti-reflection layer. The anti-reflection layer is formed by plating or coating a film layer for reducing reflectivity on the substrate layer 162 of the cover plate 160.

In some embodiments, the optical layer 164 is or includes an anti-glare layer. The anti-glare layer, also known as Anti-Glare Coating (AG coating), uses the uniform atomization of the surface to achieve the scattering effect of reflected light, reduce the reflected light of the processed surface, and reduce the interference of light on the eyes.

In some embodiments, the optical layer 164 is or includes an anti-fouling layer. The anti-fouling layer is also called anti-smudge coating or anti-fingerprint coating. Under visible light and infrared light, the coating of the anti-fouling layer is transparent, and the coating of the anti-fouling layer has the characteristics of low friction coefficient and water contact angle greater than 110°, which can make the surface of the product coated with the anti-fouling layer have functions such as high waterproof, fingerprint-proof, anti-fouling, anti-fog, scratch-proof, anti-static, easy-to-wipe, or the like.

Referring to FIG. 2, the cover plate 160 has a first thickness $T_1$, which may range from about 25 µm to about 200 µm. In some embodiments, the first thickness $T_1$ may be in a range from about 25 µm to about 50 µm, such as about 30 µm. Therefore, using such thin cover plate as the cover plate of the touch display panel will not cause a significant increase in thickness, and the thickness size of the touch display panel can be reduced.

The base layer 156 in the polarizing layer of the polarizer 150 may have a second thickness $T_2$, which may be in the range of about 10 µm to about 20 µm, for example, about 12 µm.

The entire layer of the polarizer 150 may have a third thickness $T_3$, which may be in the range of about 90 µm to about 150 µm, for example, about 110 µm.

The cover plate 160 and the polarizer 150 have a total thickness $T_4$, which may be in the range of about 110 µm to about 300 µm, preferably in the range of about 115 µm to about 150 μm, more preferably in the range of 120 μm to about 140 μm, for example, about 137 μm.

Using a thin cover plate will not significantly increase the total thickness of the touch display panel. In some embodiments, the use of ultra-thin glass in the cover plate can enhances the surface strength and hardness of the touch display panel, as well as the user's touch feel. Further, since the cover plate covers the polarizer having the non-polarized window, the user contact surface of the touch display panel is completely flat, and even a stylus pen can be used to operate over the non-polarized window, so that the user experience can be improved.

The following FIGS. 3 through 7 illustrate the processes of manufacturing a touch display panel according to some embodiments.

Figure 3:
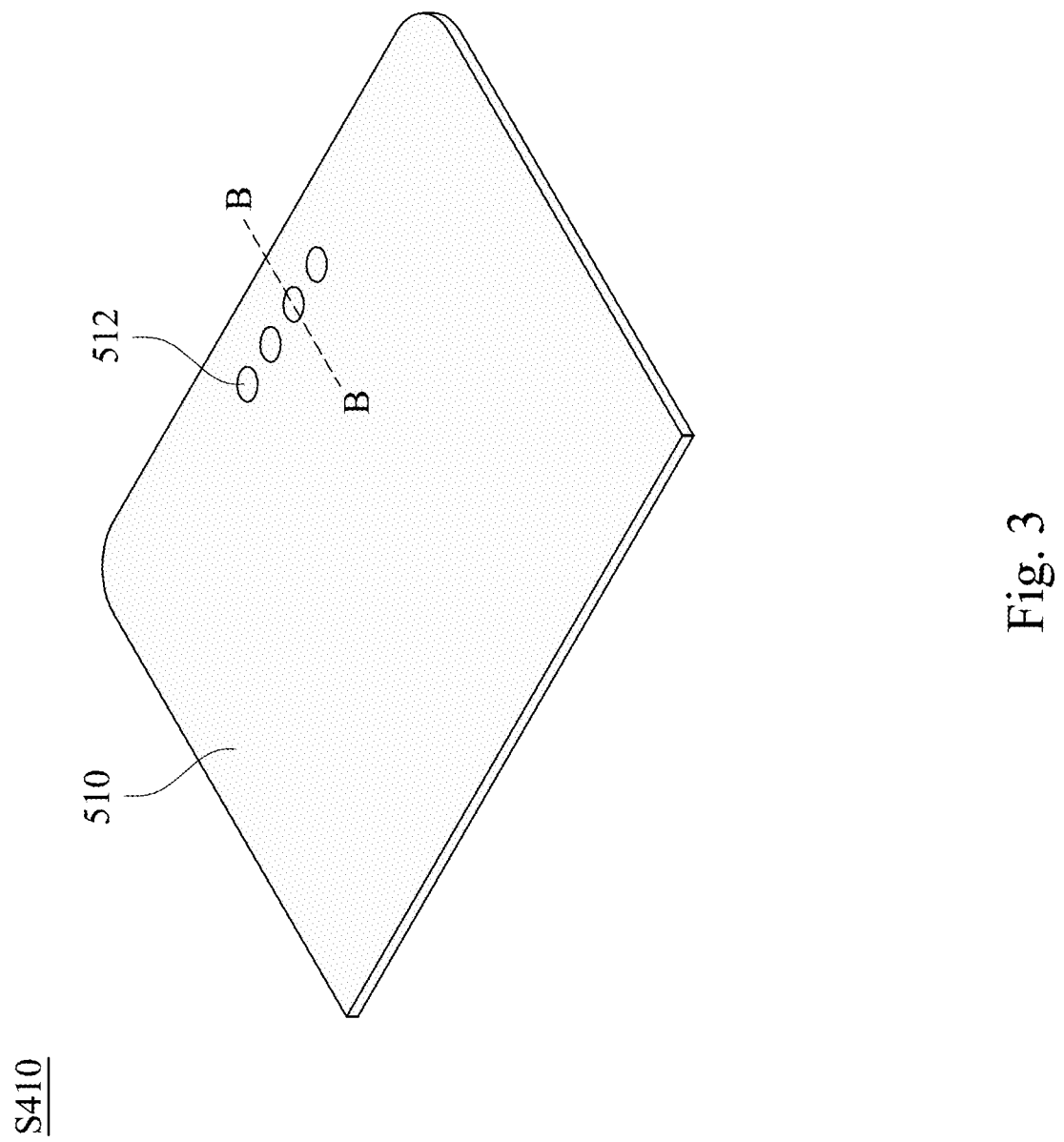
FIG. 3 illustrates a perspective view of an intermediate structure at an intermediate stage during the method for manufacturing the touch display panel, in accordance with some embodiments.

Referring to FIG. 3, in step 410, a polarizer having a non-polarized window is formed. The polarizer 510 may be a polarizer as shown in FIG. 2 and have the base layer 156 and the dichroic absorption layer 154 in the base layer 156. The polarizer also has non-polarized windows 512 (i.e., the non-polarized window 152 in FIG. 2). The polarizer 510 also includes the first adhesive layer 310, the second adhesive layer 312, the first protective layer 320, the second protective layer 322, the first optical clear adhesive layer 330, and the second optical clear adhesive layer 332, as shown in FIG. 2.

In an embodiment, after the polyvinyl alcohol film is formed, an iodine compound is applied to form a dichroic absorption layer. Then, chemical bleaching or laser is used to focus on the portion of the dichroic absorption layer to be removed, and the polyvinyl alcohol film is not removed. Next, the first adhesive layer 310, the first protective layer 320, and the first optical clear adhesive layer 330 are sequentially attached to one side of the polyvinyl alcohol film, and the second adhesive layer 312, the second protective layer 322, and the second optical clear adhesive layer 332 are sequentially attached to the other side of the polyvinyl alcohol film.

Figure 4:
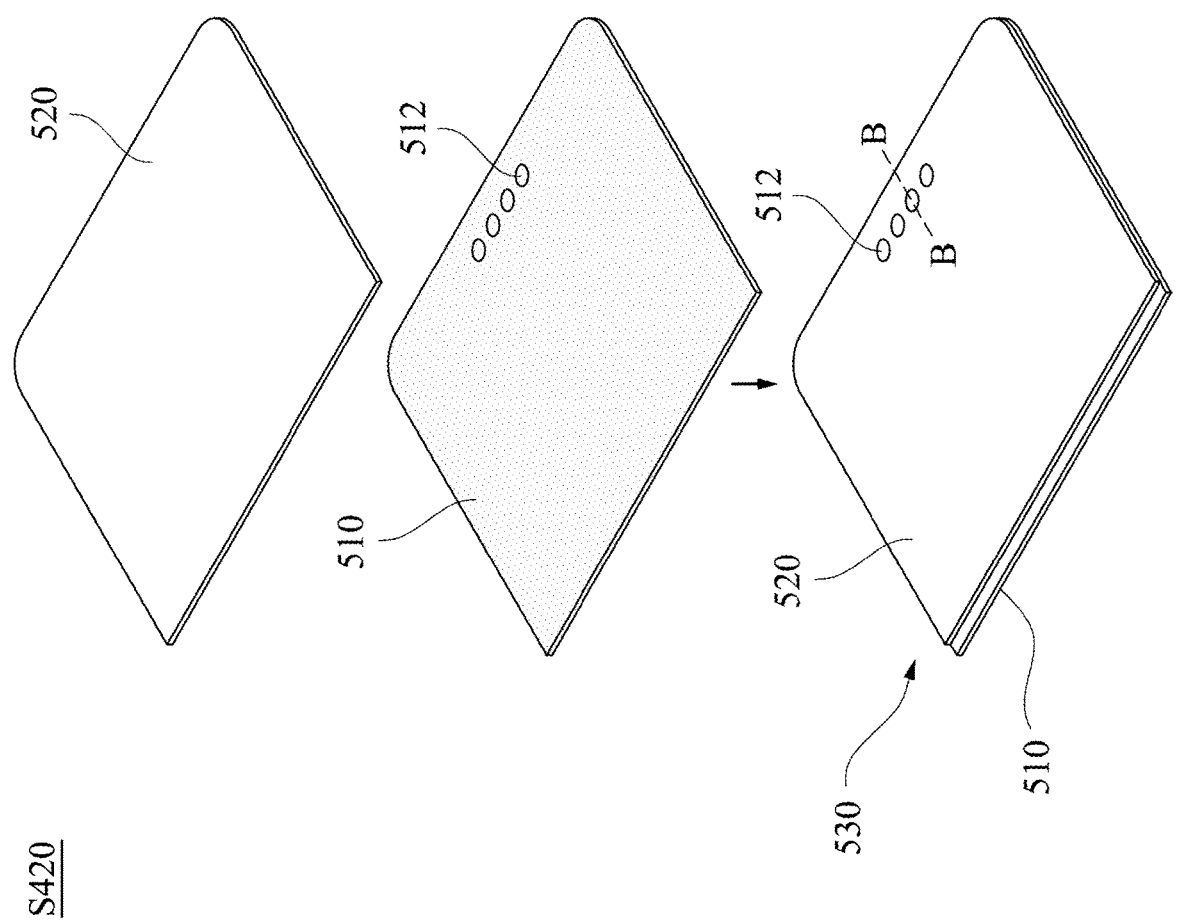
FIG. 4 illustrates a perspective view of an intermediate structure at an intermediate stage during the method for manufacturing the touch display panel, in accordance with some embodiments.

Referring to FIG. 4, in step S420, the polarizer having the non-polarized windows is attached to a cover plate to obtain a first stack structure. As shown in FIG. 4, the polarizer 510 having the non-polarized windows 512 is attached to a cover plate 520 to obtain a first stack structure 530.

In some embodiments, the size of the polarizer 510 is similar to and slightly larger than that of the cover plate 520. As shown in FIG. 4, in one side of the first stack structure 530, the edge of the side of the polarizer 510 protrudes from the edge of the corresponding side of the cover plate 520. In other embodiments, edges of multiple sides of the polarizer 510 are larger than the edges of the corresponding multiple sides of the cover plate 520.

Figure 5:
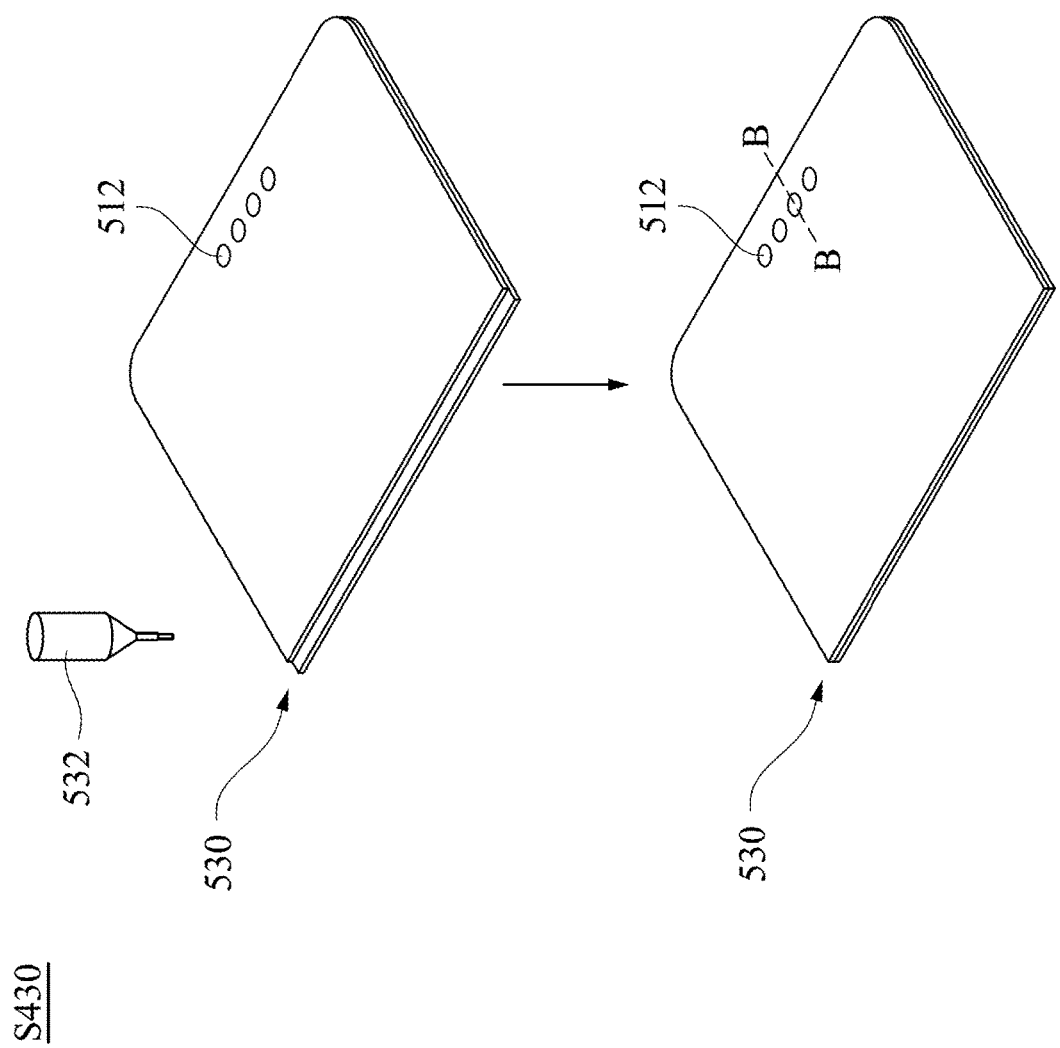
FIG. 5 illustrates a perspective view of an intermediate structure at an intermediate stage during the method for manufacturing the touch display panel, in accordance with some embodiments.

Referring to FIG. 5, in step S430, the edges of the first stacked structure are trimmed. In some embodiments, the edges of the first stacked structure 530 are trimmed by a laser device 532. The advantages of using laser cutting include small edge collapse, high cutting accuracy, no crack and special-shaped cutting. In some embodiments, the laser may be an ultraviolet laser or a carbon dioxide laser.

Figure 6:
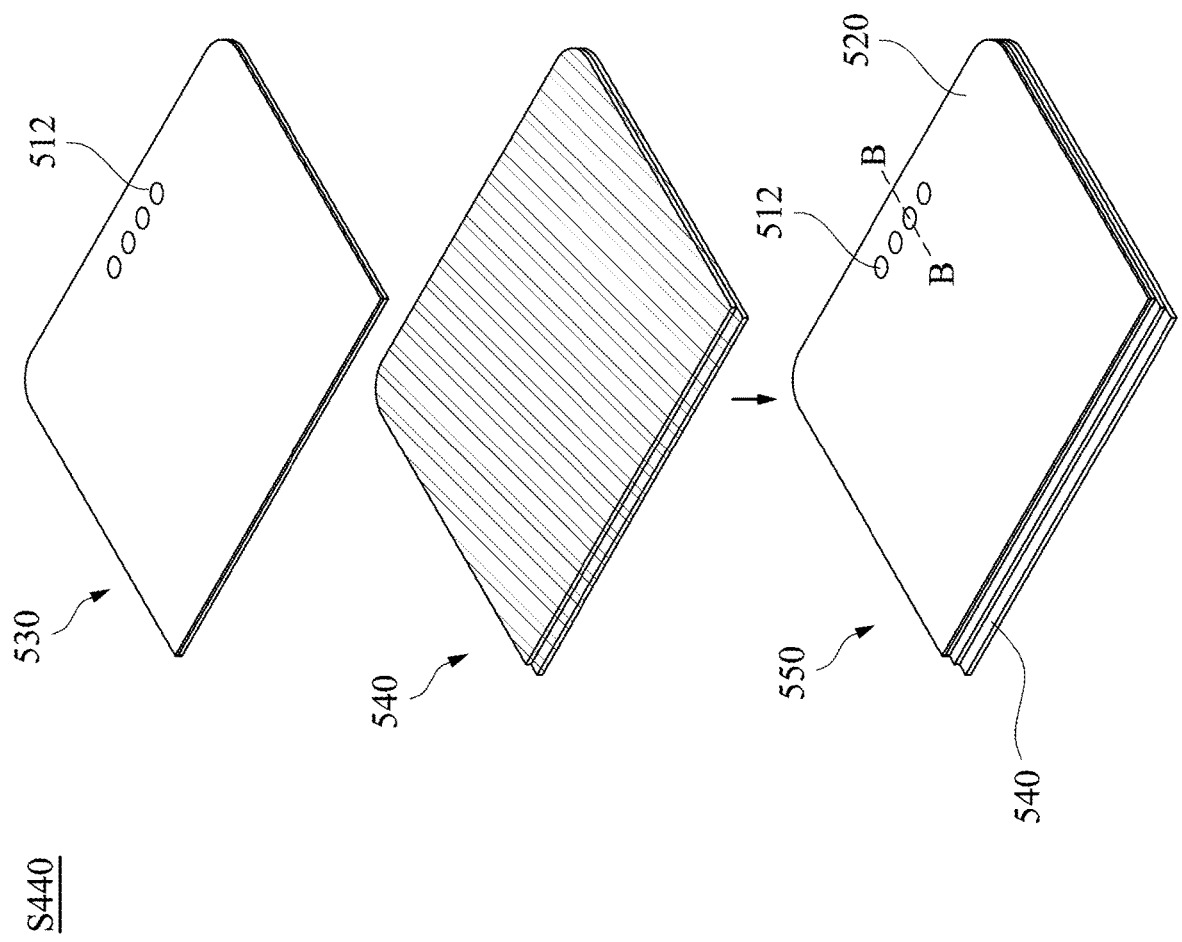
FIG. 6 illustrates a perspective view of an intermediate structure at an intermediate stage during the method for manufacturing the touch display panel, in accordance with some embodiments.

Referring to FIG. 6, in step S440, the first stack structure is attached to an embedded touch LCD module to form a second stack structure. As shown in FIG. 6, the first stack structure 530 is attached with the embedded touch LCD module 540 to form a second stack structure 550.

The embedded touch LCD module 540 has a non-filter window (see non-filter window 142 in FIG. 1B), and after attaching, the positions of the non-polarized windows 512 corresponds to the positions of the non-filter windows of the embedded touch LCD module 540.

Figure 7:
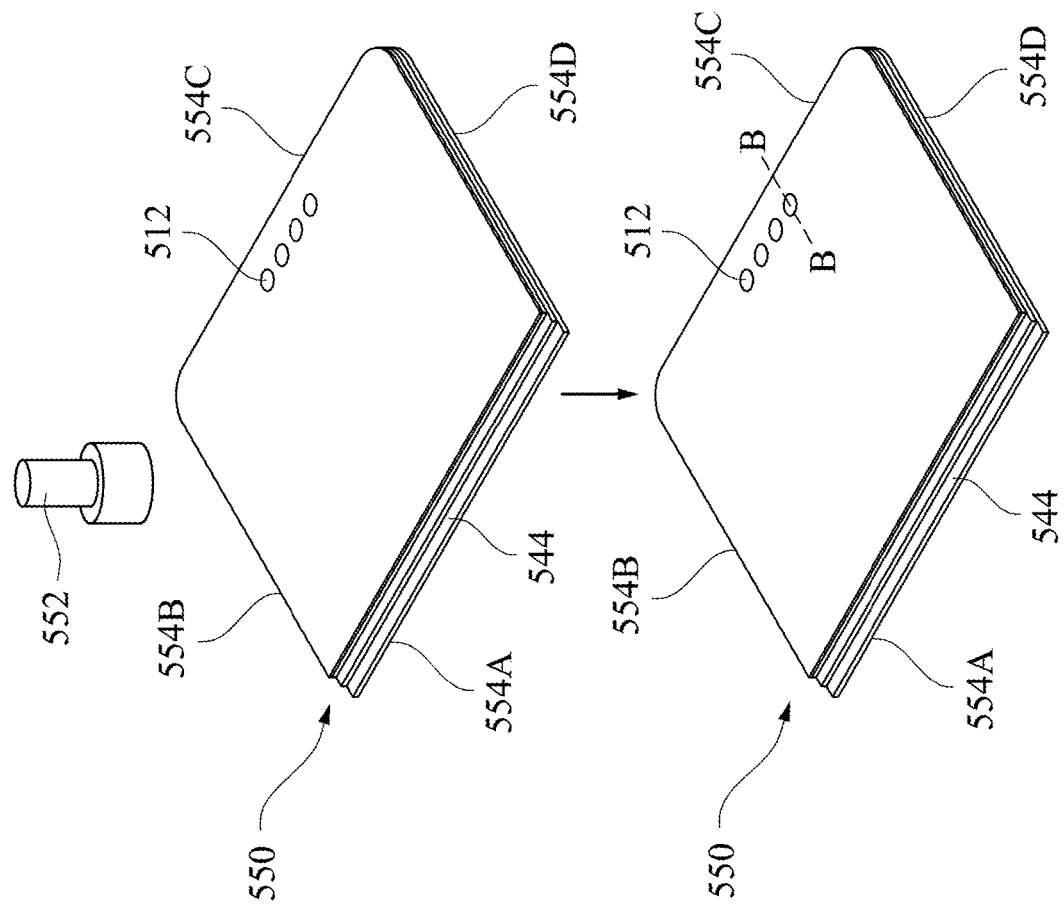
FIG. 7 illustrates a perspective view of an intermediate structure at an intermediate stage during the method for manufacturing the touch display panel, in accordance with some embodiments.

Referring to FIG. 7, in step S470, the edges of the non-terminal region of the second stack structure are grinded. As shown in FIG. 7, the edges of the non-terminal region of the second stack structure 550 are grinded.

The second stack structure 550 has a first side 554A, a second side 554B, a third side 554C, and a fourth side 554D. The embedded touch LCD module 540 has a terminal region 544 near the first side 554A of the second stack structure 550. The second side 554B, the third side 554C, and the fourth side 554D of the second stack structure are grinded by the grinding device 552, so that the corresponding edges of the cover plate 520, the polarizer 510, and the embedded touch LCD module 540 are flush and smooth at these sides. To avoid contamination of the terminal region 544, the first side 554A is not grinded.

Figure 8:
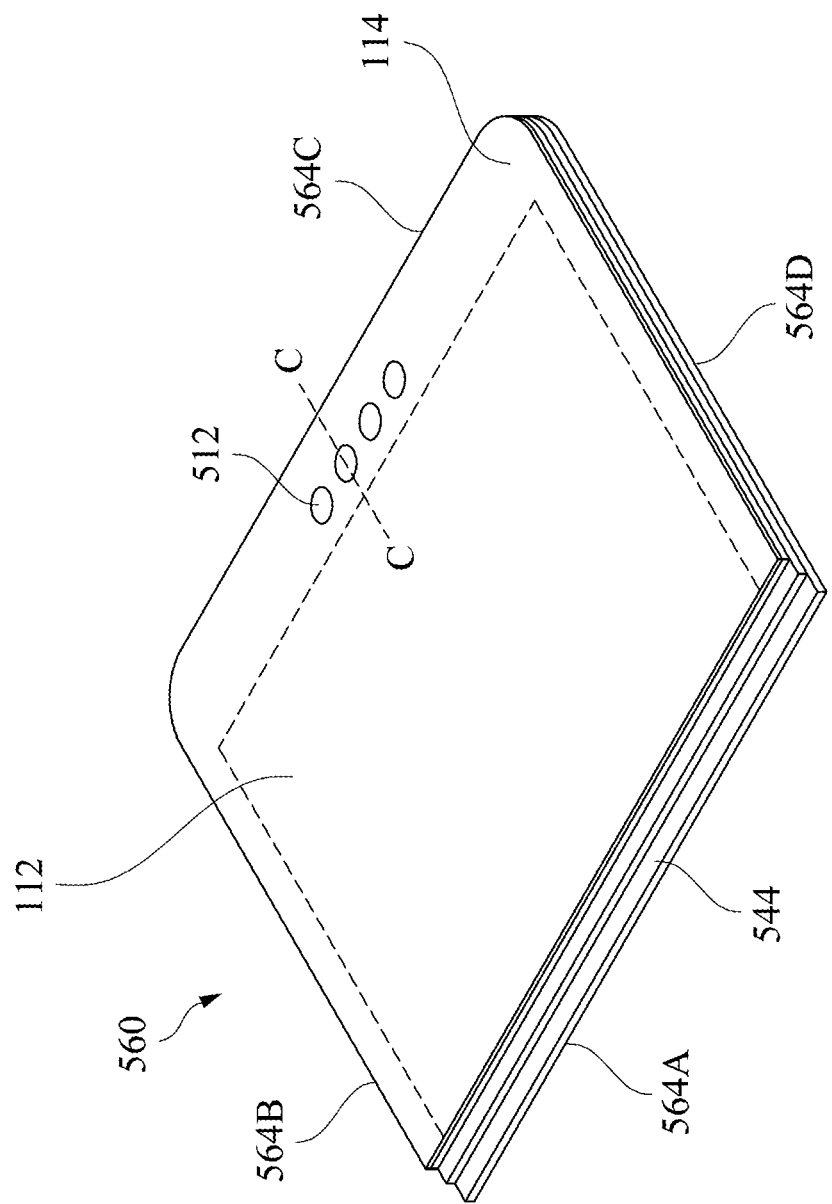
FIG. 8 illustrates a touch display panel according to some embodiments.

FIG. 8 illustrates a top view of a touch display panel formed by a manufacturing method according to embodiments of the present disclosure. The touch display panel 560 includes a non-display area 114 and a display area 112 surrounded by the non-display area 114. The display area 112 may be referred to as an active area of a LCD Module (LCM) (i.e., LCM AA area), as shown in FIG. 1B, which corresponds to the region of the color filter layer 240 having sub-filter units 244R, 244G, and 244B. The non-display area 114 may be referred to as a black matrix area (BM area), that is, a black edge around the display area 112, as shown in FIG. 1B, which corresponds to the position of the black matrix 242 at the periphery of the display device 100.

As shown in FIG. 8, the touch display panel 560 has a first side 564A, a second side 564B, a third side 564C, and a fourth side 564D. The embedded touch LCD module includes a terminal region 544 located near the first side 564A of the touch display panel 560. In the second side 564B, the third side 564C, and the fourth side 564D, a plurality of corresponding edges of the embedded touch LCD module, the polarizer, and the cover plate are flush.

In some embodiments, as shown in FIG. 8, in the first side 564A, the edge of the embedded touch LCD module exceeds the corresponding edge of the cover plate and the corresponding edge of the polarizer. The first side 564A may be covered with a metal sheet (e.g., an iron sheet) during the assembling of the whole machine.

In other embodiments, in the first side 564A, a plurality of corresponding edges of the embedded touch LCD module, the polarizer, and the cover plate are flush (not shown). That is, the cover plate and the polarizer can also be arranged to cover the terminal region 544 of the embedded touch LCD module.

Figure 9:
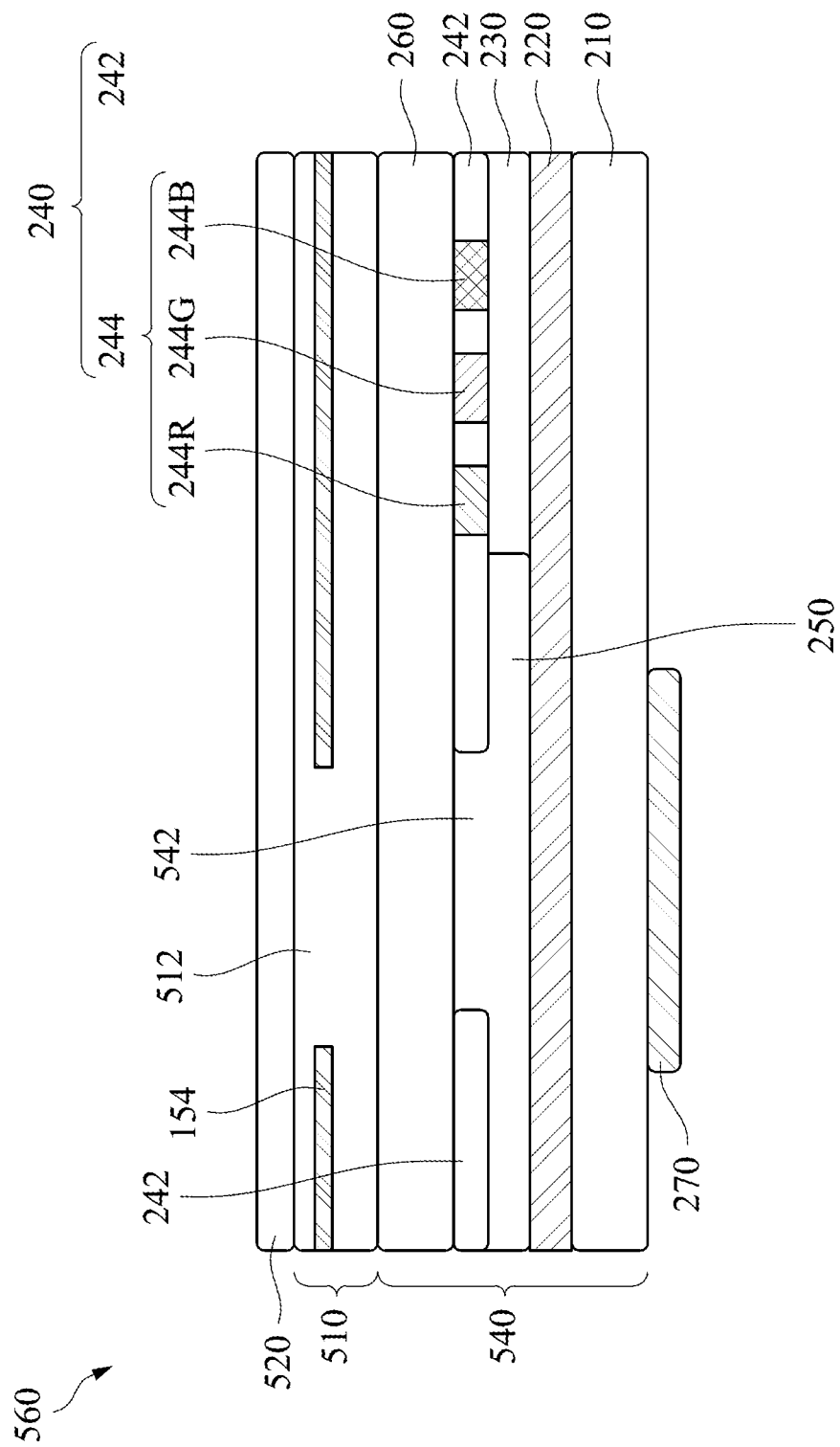
FIG. 9 is a cross-sectional view of the touch display panel of FIG. 8 along cutting line C-C.

FIG. 9 is a cross-sectional view of the touch display panel of FIG. 8 along cutting line C-C. It can be seen that the touch display panel 560 includes an embedded touch LCD module 540, a polarizer 510, and a cover plate 520 which are sequentially stacked. The position of the non-polarized window 512 of the polarizer 510 corresponds to the non-filter window 542 of the embedded touch LCD module 540.

For each layer of the embedded touch LCD module 540 in FIG. 9, please refer to the relevant description of the elements with the same reference number in FIG. 1B, and the description will not be repeated here.

In some embodiments, after the touch display panel is formed, the whole machine is assembled, and the touch display panel is assembled with the optical module, the backlight module and other components to form a display device. The display device may be, for example, a mobile phone, a tablet computer, a notebook computer, a wearable device (for example, a smart watch), or other display devices having touch function.

According to the touch display panel and the display device including the touch display panel provided by various embodiments of the present disclosure, the outermost user's contact surface of the display panel is a full-plane surface, which can be operated by a stylus pen, so that the operation is more convenient and the user's touch feeling is improved. That is to say, there is no notch or depression in the cover plate corresponding to the underlying light sensor module and the non-polarized window, but the full-plane cover plate is located outside the touch display panel. In some embodiments, the cover plate uses ultra-thin glass, which can achieve a thinner and lighter display panel and better enhance the user's touch feeling. In addition, the polarizer over the liquid crystal layer has a non-polarized window, so the polarizer does not affect the function of the underlying optical module. Furthermore, in the formed display panel, the contours of the cover plate, the polarizer and the embedded touch LCD module on the left side (i.e., the second side), the upper side (i.e., the third side) and the right side (i.e., the fourth side) are consistent and beautiful.

Although the present disclosure has been disclosed in many embodiments and examples, it is not intended to limit the present disclosure. Anyone skilled in the art can make various changes and modifications without departing from the spirit and scope of the present disclosure. Therefore, the scope of protection of the present disclosure shall be subject to the scope of the appended claims.

What is claimed is:

1. A touch display panel comprises:
   an embedded touch liquid crystal display (LCD) module, comprising a non-filter window;
   a polarizer, disposed over the embedded touch LCD module, wherein the polarizer includes a polarizing layer, the polarizing layer includes a base layer and a dichroic absorption layer disposed in the base layer, the dichroic absorption layer has a non-polarized window, and a first vertical projection of the non-polarized window overlaps with a second vertical projection of the non-filter window;
   a cover plate, overlaying the polarizer; and
   an infrared ink layer disposed under the embedded touch LCD module, wherein a third vertical projection of the infrared ink layer overlaps with the first vertical projection of the non-filter window and the second vertical projection of the non-polarized window.

2. The touch display panel of claim 1, wherein the base layer includes polyvinyl alcohol, and the dichroic absorption layer includes iodine compounds.

3. The touch display panel of claim 1, wherein the cover plate has a thickness less than about 200 μm.

4. The touch display panel of claim 1, wherein the cover plate comprises ultra-thin glass, polymethylmethacrylate, polyethylene terephthalate, or polycarbonate.

5. The touch display panel of claim 1, wherein the cover plate comprises a substrate layer and an optical layer, and the optical layer is an anti-reflection layer, an anti-glare layer, an anti-fouling layer, or a combination thereof.

6. The touch display panel of claim 1, wherein a hardness of the cover plate is greater than 7H of pencil hardness.

7. The touch display panel of claim 1, wherein the cover plate includes tempered ultra-thin glass.

8. The touch display panel of claim 1, wherein the touch display panel has a first side, a second side, a third side and a fourth side, and the embedded touch LCD module further comprises a terminal region located near the first side of the touch display panel, and in the second side, the third side and the fourth side, a plurality of respective edges of the embedded touch LCD module, the polarizer, and the cover plate are flush.

9. The touch display panel of claim 8, wherein in the first side, an edge of the embedded touch LCD module exceeds a corresponding edge of the cover plate and a corresponding edge of the polarizer.

10. The touch display panel of claim 8, wherein in the first side, an edge of the embedded touch LCD module is flush with a corresponding edge of the cover plate and a corresponding edge of the polarizer.

11. The touch display panel of claim 1, wherein the polarizer and the cover plate have a total thickness less than about 300 μm.

12. A display device, comprising:
   the touch display panel of claim 1; and
   an optical module, disposed under the embedded touch LCD module, and a fourth vertical projection of the optical module overlaps with the first vertical projection of the non-filter window and the second vertical projection of the non-polarized window.

13. The touch display panel of claim 1, wherein the cover plate comprises an ultra-thin glass and an optical layer, a thickness of the ultra-thin glass is less than 50 μm, and a total thickness of the cover plate and the polarizer is less than 300 μm.

* * * * *